(12) United States Patent  
Pluister

(10) Patent No.: US 7,495,175 B2
(45) Date of Patent: Feb. 24, 2009

(54) BUNDLED CABLES AND METHOD OF MAKING THE SAME

(75) Inventor: Andrew M. Pluister, Racine, WI (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/775,485

(22) Filed: Jul. 10, 2007

(65) Prior Publication Data

US 2008/0000670 A1 Jan. 3, 2008

Related U.S. Application Data

(62) Division of application No. 10/768,418, filed on Jan. 29, 2004, now Pat. No. 7,272,284.

(51) Int. Cl.
*H01B 7/00* (2006.01)
(52) U.S. Cl. .............................. 174/113 R; 174/113 C
(58) Field of Classification Search ............ 174/110 R, 174/110 PM, 113, 117 R, 117 A
See application file for complete search history.

(56) References Cited

U.S. PATENT DOCUMENTS

| | | | |
|---|---|---|---|
| 4,844,604 A | 7/1989 | Bishop et al. | |
| 4,997,689 A | 3/1991 | Langen et al. | |
| 5,132,488 A | 7/1992 | Tessier et al. | |
| 5,321,202 A | 6/1994 | Hillburn | |
| 5,369,720 A | 11/1994 | Parry et al. | |
| 5,698,477 A * | 12/1997 | Iwamaru et al. ............. | 442/136 |
| 5,789,711 A | 8/1998 | Gaeris et al. | |
| 5,908,873 A | 6/1999 | Shustack | |
| 5,952,615 A | 9/1999 | Prudhon | |
| 5,969,295 A | 10/1999 | Boucino et al. | |
| 6,125,224 A | 9/2000 | Benzel | |
| 6,297,454 B1 | 10/2001 | Gareis | |
| 6,304,698 B1 | 10/2001 | Morris | |
| 6,395,393 B1 | 5/2002 | Akita et al. | |
| 6,455,607 B1 | 9/2002 | Shustack | |
| 6,498,883 B1 | 12/2002 | Wilson | |
| 6,559,385 B1 | 5/2003 | Johnson et al. | |
| 6,624,359 B2 | 9/2003 | Bahlmann et al. | |
| 6,639,152 B2 | 10/2003 | Glew | |
| 6,790,505 B1 * | 9/2004 | Goux et al. .................. | 428/114 |
| 7,132,028 B1 * | 11/2006 | Wahlers-Schmidlin et al. ........................... | 156/184 |
| 7,241,482 B2 * | 7/2007 | Ferrand ..................... | 428/40.1 |
| 2002/0125036 A1 * | 9/2002 | Price et al. .............. | 174/113 R |
| 2003/0118296 A1 | 6/2003 | Smith | |
| 2004/0062496 A1 * | 4/2004 | Shuman et al. ............. | 385/101 |
| 2004/0262027 A1 | 12/2004 | Kaczmarski | |
| 2005/0069666 A1 * | 3/2005 | Ferrand ..................... | 428/40.1 |

FOREIGN PATENT DOCUMENTS

WO WO 01/09263 A * 2/2001

OTHER PUBLICATIONS

Article entitled "Belden Homechoic Banana Peel CAT 5E Composite Cables Feature a Unique Jacketless Design", appearing on www.hometoys.com website, 1996.

* cited by examiner

*Primary Examiner*—William H Mayo, III
(74) *Attorney, Agent, or Firm*—Scully, Scott, Murphy & Presser, P.C.

(57) ABSTRACT

A method of bundling a plurality of cables to retain them together during use and installation and facilitating the cables to be easily separated for termination. The plurality of cables are bundled about a central flexible strip which is coated with an adhesive, such as a thermoplastic heat-sealable resin contacted by the cables.

5 Claims, 3 Drawing Sheets

BUNDLED CABLES AND METHOD OF MAKING THE SAME

CROSS REFERENCE TO RELATED APPLICATION

The present application is a divisional application of application Ser No. 10/768,418, filed Jan. 29, 2004, which issued as U.S. Pat. No. 7,272,284 B1 on Sep. 18, 2007.

FIELD OF THE INVENTION

This invention relates in general to bundled cables and a method for making the same, and particularly, to bundled cables that maintain the cables in place during installation and use and which permit the cables to be easily removed by hand from the bundle for termination or connectorization.

BACKGROUND OF THE INVENTION

With the increased use of computers and other electronic devices being commonplace in buildings and other structures, the installation of cables (such as cables used to provide voice, data and video distribution throughout building such as houses, condominiums, apartment complexes, schools and the like) has become an important part of both new construction and in renovating old buildings. Installation of electrical or other cables often involves feeding a number of cables through a length of ductwork or other conduits. As there are often numerous cables that must be installed, it is accordingly advantageous to bundle cables together to permit a plurality of cables to travel through the conduits or ductwork of the building at the same time. As different cables will need to be connected at different points in the building and to different cables, devices, or systems, it is important that the cables be easily separable for termination or connectorization.

One known way to bundle cables is to surround a plurality of cables with an outer jacket. The cables may be separated within the jacket through a central spline or similar device. While use of an outer jacket to cover the cables may work in certain situations, several problems have arisen during their use. First, in order to separate the cables for termination or connectorization, it is necessary to peel off the outer jacket resulting in, among other things, increased labor costs. Further, the use of an outer jacket increases the overall size and weight of the bundled cables.

Another known way to bundle cables is to tie a plurality of cables together using a plastic strap or tie having a locking mechanism on one end. Once the cables are tied together, they may be pulled through the ductwork or conduit. However, during installation, the cables tend to separate or pull apart, making it more difficult to pull the cables through the conduit and leading to possible damage to the cables.

Another known way to bundle cables is to weld the cables to an extruded rigid central spline. An example of such a system is the HomeChoice® Banana Peel™ products manufactured and sold by Belden Wire & Cable Co. of Richmond, Ind. However, it is often difficult to remove the individual cables from the central spline for termination or connectorization of the cables. Furthermore, the rigidity of the spline also makes the overall bundle of cables rigid, thereby making it more difficult to bend or otherwise maneuver the bundle during installation. The spline is also susceptible to cracking when the bundled cables are bent at cold temperatures.

Therefore, there is a need to produce a bundled cable that is flexible, lightweight and allows the cables to be easily removed for termination or connectorization, while being economical and easy to manufacture and install.

SUMMARY OF THE INVENTION

The present invention is an innovative improvement over the prior devices and ways to bundle cables together in that the way that the cables are semi-permanently attached using a flexible strip or tape coated with a thermoplastic heat-sealable resin such that they may be easily removed by hand is an improvement over the prior art. In particular, the bundled cables and method of making bundled cables of the present invention includes a central flexible strip or adhesive tape having a heat-sealable resin that may be heated and cooled to allow a plurality of cables to be removably attached to the tape.

In operation, the strip or tape is heated to a sufficient temperature to activate the heat-sealable resin. The cables are then wrapped around the strip. As the adhesive cools to room temperature, the cables become bound to the strip. The bond between the strip and the cables is strong enough to maintain the cables in place during installation and use, while still permitting the cables to be easily removed by hand for termination or connectorization.

It is therefore an object of the present invention to provide a new and improved system and method to bundle cables that allows cables to be held together during installation and use, but easily separated for termination or for use.

Another object of the present invention is to provide a system and method for creating bundled cables that are flexible.

A further object of the present invention is to provide a system and method for creating bundled cables that are lightweight.

A yet further object of the present invention is to provide a system and method for providing bundled cables having a lower brittle point temperature.

Another object of the present invention is to provide bundled cables that allow for the instant identification of the individual cables.

Yet another object of the present invention is to provide a system and method for providing bundled cables that are easy and economical to manufacture.

Other objects, features and advantages of the invention will be apparent from the following detailed disclosure, taken in conjunction with the accompanying sheets of drawings, wherein like reference numerals refer to like parts.

DETAILED DESCRIPTION OF THE INVENTION

Figure 1:
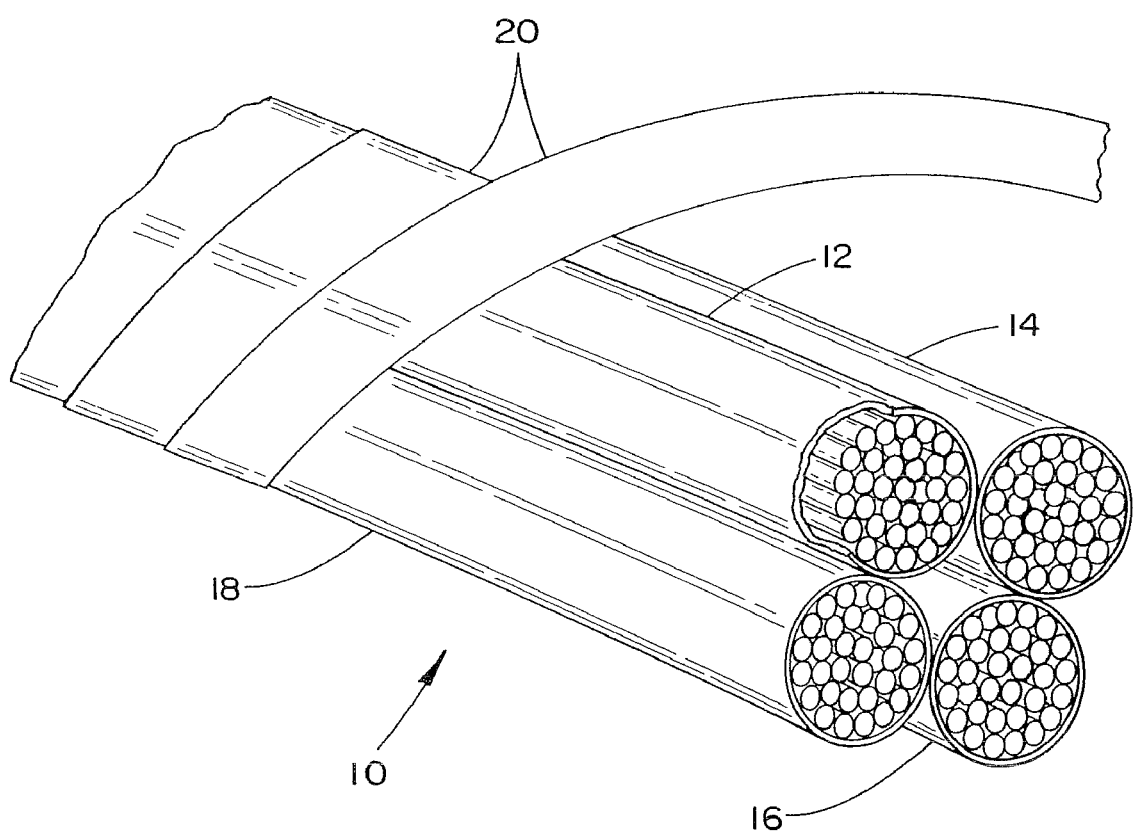
FIG. 1 is a perspective view of an embodiment of the bundled cables of the present invention showing four cables being removably connected to a flexible strip.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Figure 2:
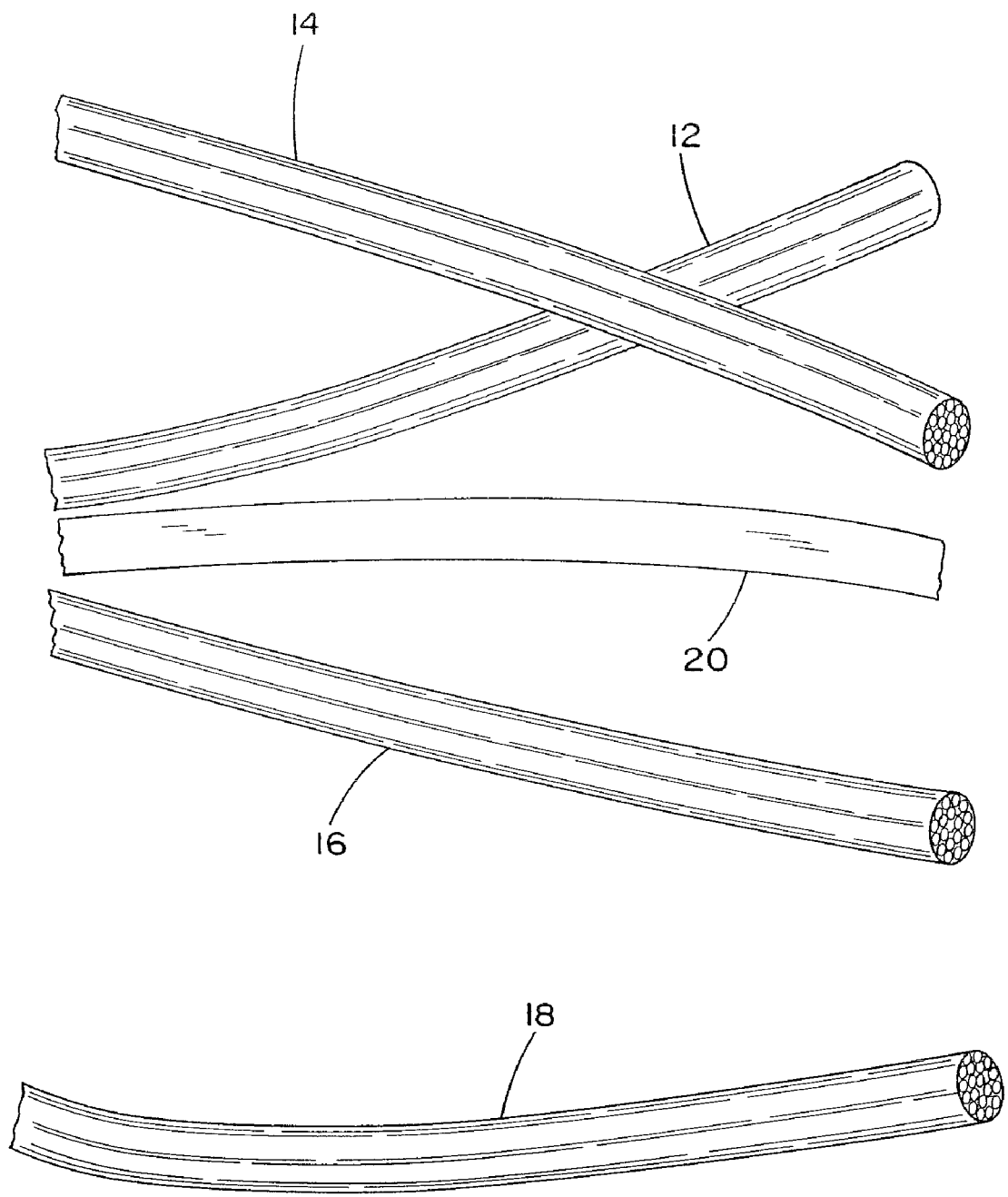
FIG. 2 is an exploded perspective view showing four cables and a flexible strip.

Referring now to the drawings, and particularly to FIGS. 1 through 2, there is shown a preferred embodiment of the present invention. The bundled cables of the present invention, generally designated by the numeral 10, comprises a plurality of cables 12, 14, 16, 18 and a central flexible strip or tape 20. While a bundled cable having four cables and one flexible strip is shown and disclosed, it is appreciated that any number of cables and flexible strips may be used and not depart from the scope of the present invention. It is also appreciated that a flexible central member other than a strip or tape may be used and not depart from the scope of the present invention.

The cables 12, 14, 16, 18 are preferably individually jacketed cables. In a preferred embodiment, two of the cables are Category 5e # 24 gauge, four pair cables with flame-retardant PVC jackets for voice and data communication, and two of the cables are RG-6/U cables with flame retardant PVC jackets for video and data services. However, it is appreciated that the cables may be of any of a variety of different cables and not depart from the scope of the present invention.

Figure 3:
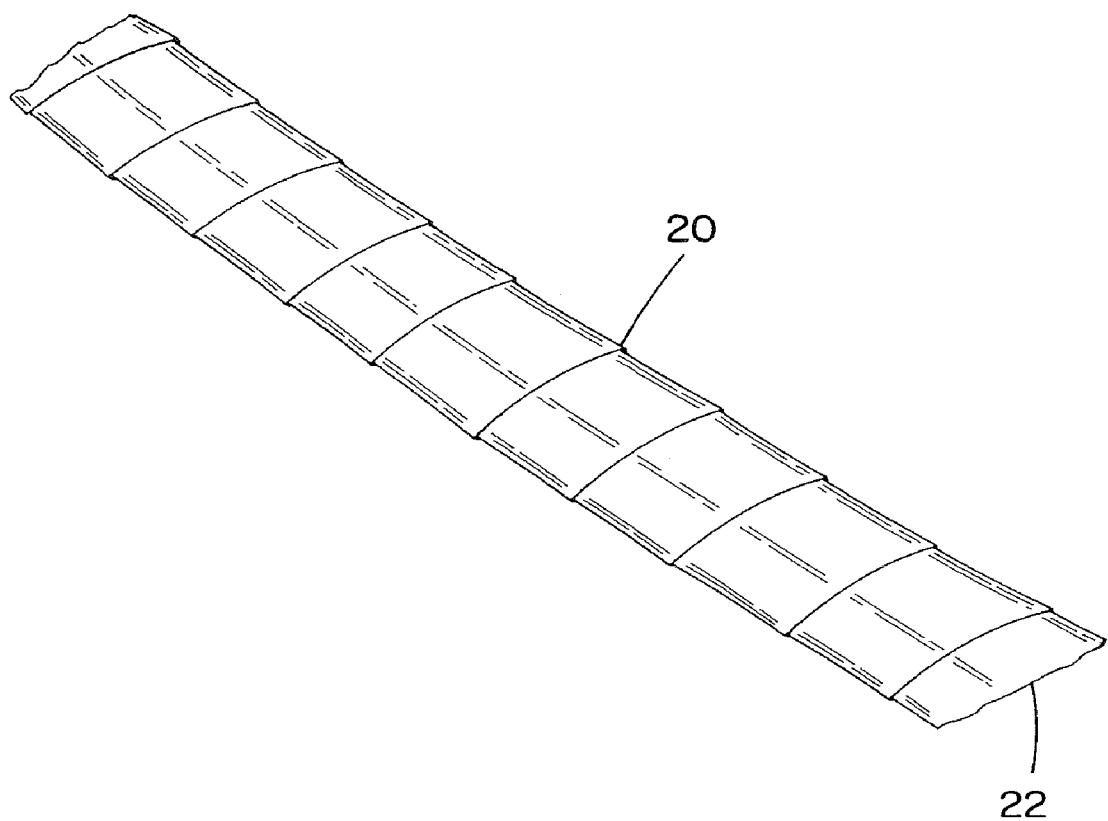
FIG. 3 is a perspective view of a flexible strip of the present invention.

The strip or tape 20 is preferably a flat ⅜ inch wide woven polyester tape, however, it is appreciated that a variety of different types and sizes of tape or other flexible strips may be used and not depart from the scope of the present invention. Referring now to FIG. 3, the tape 20 is preferably coated in a known way with a heat-activated adhesive such as a thermoplastic heat-sealable resin 22. The heat-sealable resin is activated by heating the tape to or past the melting point of the heat-sealable resin by an inline heater or other heat source. Although a flexible tape having a heat-sealable resin coated thereon is shown and disclosed, it is appreciated that other heat-activated adhesives or other adhesives may be used, or one or more adhesive strips may be attached to the flexible strip, and not depart from the scope of the present invention.

In operation, the tape 20 with the adhesive 22 is heated to a temperature that is equal to or greater than the melting point of the heat-sealable resin (e.g., to approximately 270 degrees Fahrenheit). Each of the plurality of cables 12, 14, 16, 18 is then placed onto and, if desired, wrapped around the tape. In the preferred embodiment, one Category 5e cable and one RG-6/U cable are placed on each side of the flat tape. As the tape cools, the heat-sealable resin: will bond to the plurality of cables. The bond created by the heat-sealable resin is strong enough to hold the cables together during normal installation procedures and during use, but allows the cables to be pulled apart by hand to permit the cables to be attached or terminated. In the preferred embodiment, the adhesive bond is not affected by cold temperatures and remains strong up to 120 degrees Fahrenheit. Bundling the cables according to the present invention also yields a bundle of cables that is less brittle at cold temperatures then conventional bonding systems.

Once the cables are bundled, the bundle of the present invention may be fed through a conduit or ductwork for installation. As the bundle does not require the use of an outer jacket, the bundle of the present invention will be smaller and easier to feed through the conduit or ductwork then conventional bundles. Furthermore, unlike the prior bundling systems that use, among other things, an outer jacket or a rigid spline, the use of a substantially flexible strip of material or adhesive tape increases the ability (i.e., flexibility) of the bundle of cables to be bent or otherwise maneuvered during installation. Once the bundle is pulled through the conduit or ductwork, one or more of the cables may be removed from the bundle by pulling or otherwise separating the individual cables away from the bundle so as to overcome the bond of the heat-sealable resin.

It will be understood that modifications and variations may be effected without departing from the scope of the novel concepts of the present invention, but it is understood that this application is limited only by the scope of the appended claims.

The invention claimed is:

1. A method of bundling a plurality of cables comprising the steps of:
   providing a substantially flexible central member consisting of a strip of a woven polyester tape material having a first side and a second side;
   coating an adhesive consisting of a heat-sealable resin onto one or more of the first and second sides of the flexible central strip material member;
   and bundling said plurality of cables consisting of two Category 5e cables and two RG-6/U cables into surface contact with said adhesive and extending about the flexible central strip material member to facilitate external access to said cables enabling manual detachment of selectively one or more of said cables from said adhesive-coated flexible central strip material member.

2. The method of claim 1 wherein the adhesive is heat activatable and the method further comprises the step of heating the adhesive to activate the adhesive.

3. The method of claim 2 wherein the thermoplastic heat-sealable resin is a hot melt adhesive.

4. A method of bundling cables comprising the steps of:
   providing a plurality of cables consisting of two Category 5e cables and two RG-6/U cables;
   providing a flexible flat strip of material consisting of a polyester tape;
   applying a thermoplastic heat sealable resin to at least one surface area on the flexible strip;
   heating the thermoplastic heat sealable resin to activate the thermoplastic heat sealable resin; and
   bundling the plurality of cables into surface contact with the thermoplastic heat sealable resin on the flexible strip, such that the plurality of cables become releasably attached to the flexible strip as the thermoplastic heat sealable resin cools, while facilitating external access to said cables enabling manual detachment of selectively one or more of said cables from said flexible strip.

5. The method of claim 4 wherein the thermoplastic heat-sealable resin is a hot melt adhesive.

* * * * *